(12) United States Patent
Justin (10) Patent No.: US 11,412,600 B2
(45) Date of Patent: Aug. 9, 2022

(54) SYSTEM AND METHOD OF ADJUSTING SOUND LEVEL IN A CONTROLLED SPACE

(71) Applicant: ENERGY CONTROL SERVICES LLC, Phoenix, AZ (US)

(72) Inventor: Karl H. Justin, Phoenix, AZ (US)

(73) Assignee: ENERGY CONTROL SERVICES LLC, Phoenix, AZ (US)

(*) Notice: Subject to any disclaimer, the term of this patent is extended or adjusted under 35 U.S.C. 154(b) by 0 days.

(21) Appl. No.: 17/316,709

(22) Filed: May 10, 2021

(65) Prior Publication Data

US 2022/0159813 A1    May 19, 2022

Related U.S. Application Data

(60) Provisional application No. 63/114,950, filed on Nov. 17, 2020.

(51) Int. Cl.

| | |
|---|---|
| *H05B 47/12* | (2020.01) |
| *H03G 3/32* | (2006.01) |
| *H05B 45/20* | (2020.01) |
| *H05B 45/10* | (2020.01) |

(52) U.S. Cl.
CPC ............ *H05B 47/12* (2020.01); *H05B 45/10* (2020.01); *H05B 45/20* (2020.01)

(58) Field of Classification Search
CPC ........ H05B 47/12; H05B 45/10; H05B 45/20; H03G 3/32; H03G 3/342; G06F 3/165; H04S 2400/13; H04R 2430/01; G10L 25/60; Y02B 20/40
See application file for complete search history.

(56) References Cited

U.S. PATENT DOCUMENTS

| | | | | |
|---|---|---|---|---|
| 10,097,150 | B1 * | 10/2018 | Peterson | G06F 3/165 |
| 11,127,265 | B1 * | 9/2021 | Kimchi | H04R 1/025 |
| 2002/0186129 | A1 * | 12/2002 | Rebello | G08B 21/182 |
| | | | | 340/565 |
| 2005/0275626 | A1 * | 12/2005 | Mueller | H05B 47/19 |
| | | | | 345/156 |
| 2017/0274215 | A1 * | 9/2017 | Smith | A61N 1/3993 |
| 2018/0331845 | A1 * | 11/2018 | Warren | H04L 67/125 |
| 2021/0217532 | A1 * | 7/2021 | Heimerl | G16H 40/67 |

\* cited by examiner

*Primary Examiner* — Haissa Philogene
(74) *Attorney, Agent, or Firm* — Dana Legal Services; Jubin Dana; John Dahnad (57) ABSTRACT

A system and method are disclosed for lowering the sound levels in an indoor environment or space. The system detects and measures the sound decibel level, processes the information, and provides a control signal to a lighting control module. The lighting control module alters the intensity of the lights (dims or brightens) or wavelength of the light (color) in the environment. The dimming or color change of the lights is an indicator to the people in the environment to lower the sound in the environment.

13 Claims, 5 Drawing Sheets

SYSTEM AND METHOD OF ADJUSTING SOUND LEVEL IN A CONTROLLED SPACE

CROSS REFERENCE TO RELATED APPLICATIONS

This application claims the benefit of U.S. Provisional Application Ser. No. 63/114,950 titled SYSTEM AND METHOD OF CONTROLLING SOUND LEVELS IN A CONTROLLED SPACE filed on Nov. 17, 2020 by Karl H. JUSTIN, the entire disclosure of which is incorporated herein by reference for any and all purposes.

FIELD OF THE INVENTION

The invention is in the field of computer systems and, more specifically, related to systems for sound level adjustment using lighting adjustment techniques.

BACKGROUND

Most sound level adjustment in a space is done by individuals in the space reminding one another that they are speaking too loudly or that they have the volume on an electronic device too high. One example is in the hospital environment, where sound control is currently done by the hospital staff by keeping their voices and electronic device volumes at a low level. In many instances there is little concern for the rest, peacefulness and comfort of patients when hospital staff are conversing, joking, and sharing social media clips in nursing stations. Patients, who are ill and need to rest, find that hospital staff in the nursing station near their room talk and joke with each other in loud voices, almost as if they were conversing in a park or other outside space. Loud talking and high volumes of electronic devices is particularly difficult for patients during the evening and midnight shifts when patients need sleep. Furthermore, lack of sleep in the hospital disrupts and delays patients healing.

Another example would be in a setting where people need to calm down, when they are irate or agitated. For example, when patients or family members are upset with nurse staff or doctors, the state of the person's mental stress can be disruptive to receiving communication/information from the hospital staff and instructions. Further, the metal stress level (being irate or agitated) prevents the person from making sound decisions.

Another example is in an educational setting. For instance, In the grade school, junior high school, and occasionally in the high school, boisterous students hamper the learning of other students and complicate the teachers' job. Classroom disruption by noisy students creates an environment where teacher frustration as well as the frustration level of serious students increases. The result is less effective education and lower student test scores.

Therefore, what is needed is a system and method that generates a signal to alert people in an indoor space to adjust the sound level in the indoor space.

SUMMARY OF THE INVENTION

The invention discloses a system and method that detects sound levels and informs people, in a natural way, in the space to adjust the sound level in the indoor space. For example, alerting people to adjust the volume of their voices and/or electronic devices. Systems that embody the invention, in accordance with the aspects and embodiments of the invention, include a system for sending control signals to a lighting control system for dimming lights when sound levels in a space exceed a set threshold. The dimming of the lights naturally informs people in the space to decrease the volume of their voice and of any electronic devices they are using. In accordance with some embodiments and aspects of the invention, the system generates a signal that triggers the lights to flash. In accordance with some embodiments and aspects of the invention, the system generates a signal that causes the lighting system to change the wavelength of the lights because of the speech pattern/content/tone of people in the area, wherein the speech pattern/content/tone are indicative of metal stress (agitated/irate/anger/frustration). The signal would cause the lights to become a specific color (red, green, yellow, orange, etc.) depending on the lighting control strategy developed by a user.

In accordance with some aspects and embodiments of the invention, the system includes changing the color of the lighting in the space based upon sound levels. For example, the occupants may become boisterous in a space where maintaining a relatively low level of noise is important.

In accordance with the various embodiments of the invention, a system is installed into the space that detects the sound level of its occupants, analyzes the sound level, and either maintains or changes the color of the lighting in the space. When sound level detection indicates occupants in the space are making noise above a preselected decibel level, a command will be sent to a lighting control system that will cause the lighting in the space to change color. The newly changed color of the lighting in the space will approximate the color of early dawn or dusk, which have a soothing effect. The occupants in the space will become more calm and quieter.

In accordance with some aspects and embodiments of the invention, the system collects data in a monitored space. The collected data is analyzed, stored and supplied back to the user of the installed system. The type of data collected and stored can include: 1) noise levels over time in the monitored space; 2) the timing of the noise level increase or decrease; 3) the frequency of lighting system activation; and 4) the duration of activation. The collected data may be analyzed and supplied to a customer in order to inform the customer. The collected data may also be used for adjusting the lighting system and making modifications to or expansions of the system.

BRIEF DESCRIPTION OF THE DRAWINGS

In order to more fully understand the invention, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the figures (FIGs.), in which like numbers represent the same or similar elements.

Reference throughout this specification to "one embodiment," "an embodiment," or "in accordance with some aspects" and similar language means that a particular feature, structure, or characteristic described in connection with the various aspects and embodiments are included in at least one embodiment of the invention. Thus, appearances of the phrases "in accordance with an aspect," "in accordance with one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

The ranges of values provided above do not limit the scope of the present invention. It is understood that each intervening value, between the upper and lower limit of that range and any other stated or intervening value in that stated range, is encompassed within the scope of the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Figure 1:
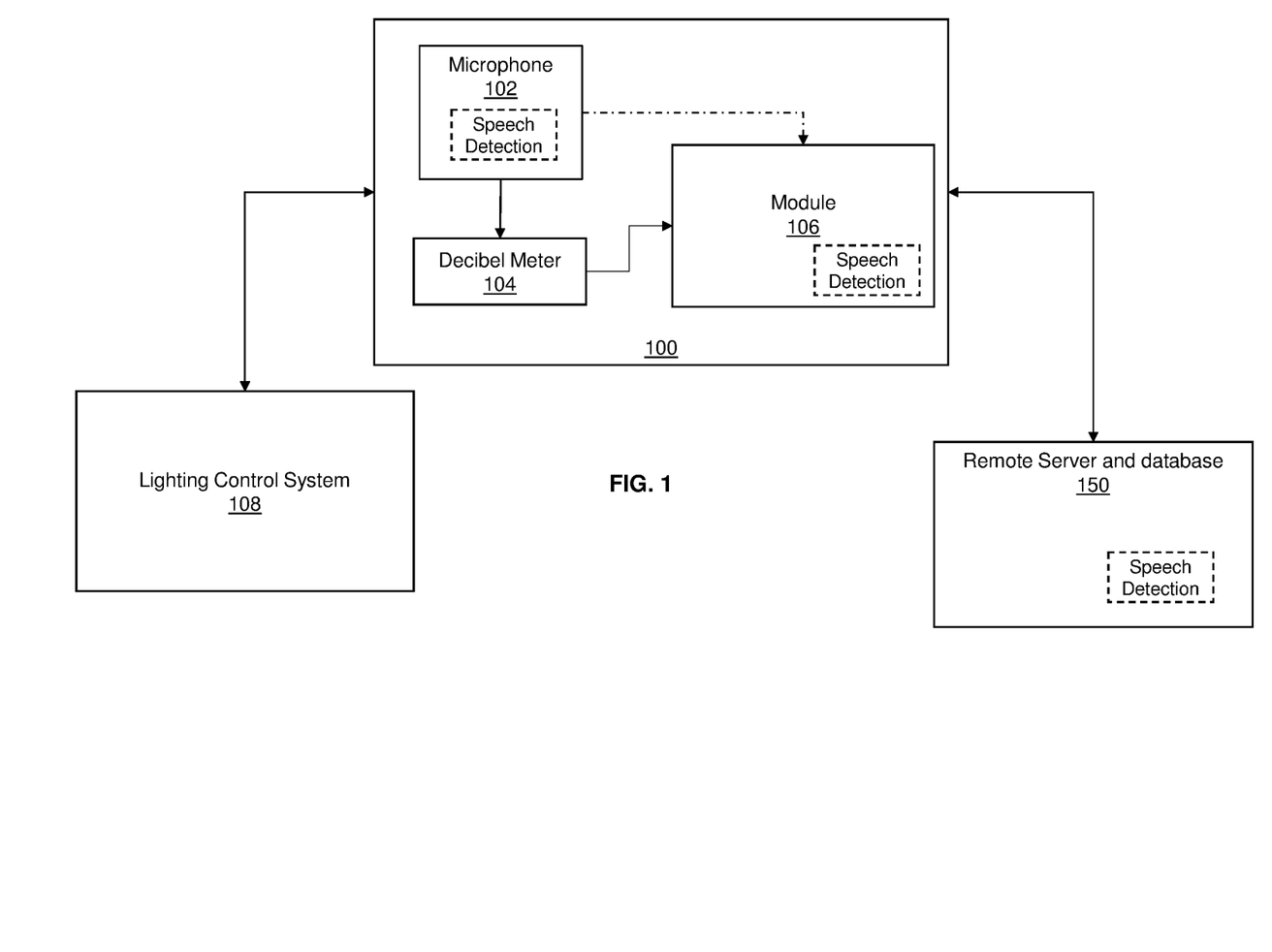
FIG. 1 shows a system for adjusting sound level in accordance with various aspects and embodiments of the invention.

Referring now to FIG. 1, according to various aspects and embodiments of the invention, a sound control system 100 includes a microphone 102 or other sound gathering device, a decibel meter 104, and a communication/control module 106. The microphone 102 communicates sound signal information to the decibel meter 104. The decibel meter 104 analyzes the sound signal information. The decibel meter 104 generates a decibel level signal and communicates the decibel level signal to the module 106. The module 106 includes a pre-programmed contact closure protocol. Using the protocol, the module 106 generates a trigger or control signal for altering the lighting intensity and for controlling lighting. In accordance with various aspects and embodiments of the invention, the system 100 is shown with a speech detection module (broken line indication optional) included as part of the microphone 102. In accordance with various aspects and embodiments of the invention, the system 100 is shown with a speech detection module (broken line indication optional) included as part of the module 106.

The system 100 is in communication with a lighting control system 108. The system 100 sends the control signal to the lighting control system 108. The lighting control system 108 controls the lights in the space. In accordance with the various aspects and embodiments of the invention, the light utilize light emitting diodes (LEDs) that can have their intensity and wavelength controlled. The scope of the present invention is not limited by the type of light source that is used. Additionally, the scope of the present invention is not limited to the space being indoor or outdoor. While the present invention is discussed in the context of an indoor space, many aspects and embodiments of the invention are equally applicable to any controlled space, such as an outdoor setting wherein lighting conditions can be altered and the space is a contained or a controlled outdoor space. Additionally, the controlled or contained space may including spaces used for evening events, such as sporting, dining settings, or concerts.

As noted herein, in accordance with various aspects and embodiments of the invention, the control signal is sent between the system 100 and the system 108 via a hard wire connection. In accordance with various aspects and embodiments of the invention, the control signal is sent between the system 100 and the system 108 using a wireless interface based on any wireless communication protocol. Additionally, the various embodiments allow for communication with the lighting control system 108, at least, via a direct communication channel or through a web-based channel.

The microphone 102 continuously monitors a space, such as a facility. The microphone 102 captures and sends sound signal information to the decibel meter 104. The decibel meter 104 sends the decibel levels of the sound information received from the microphone 102 to the module 106. The module 106 is in communication with the lighting control system 108. In accordance with some embodiments, the system 100 is wired directly into the lighting control system 108 that control the lighting conditions in the space. In accordance with some embodiments, the system 100 uses a wireless signal to communicate with the lighting control system 108, either from a location that is remote (using web-based communication set-up) from the space or a location that is proximate/nearby (using a wireless router communication set-up) the space.

As the noise level in the environment reduces or increases and falls outside of a defined range, the module 106 references its protocol and determines what action should be taken. In accordance with some aspects in an embodiment of the invention, the protocol is customizable to the client's or user's requirements. In some instances, the module 106 takes action to reduce the sound level, which needs to be lowered. In some instances, the module 106 takes action to allow the sound level to increase. The response of the system 100 is to generate a control signal that is sent, based the protocol, which may be a pre-programmed protocol.

Taking the non-limiting example where the sound exceeds the threshold or exceeds a threshold decibel level or a target decibel level, the decibel meter 104 generates a decibel level signal. The system 100 sends the decibel level signal to the module 106. In accordance with one aspect of the invention, the module 106 includes a pre-programmed contact closure protocol. The contact closure protocol can be customized from one user/client to another, and the programming can be changed accordingly. The protocol includes threshold information, which can be customized for each user.

Using information from the decibel meter 104, the module 106 generates the control signal. In accordance with some embodiments of the invention, the module 106 includes a communication module. In accordance with some embodiments of the invention, a communication module (not shown) is separate from the module 106, similar to that shown in FIG. 3 below. The system 100 sends the control signal to lighting control system 108. In accordance with one embodiment of the invention, the control signal causes the lighting control system 108 to change the wavelength of the lights. The lighting control system 108 alters the lights in the monitored space.

In accordance with some aspects and embodiments of the invention, the module 106 includes a timer unit (not shown). In accordance with some aspects and embodiments of the invention, the system 100 includes a timer unit that is in communication with the module 306 (not shown).

In accordance with one embodiment of the invention, the control signal triggers a timer, and the control signal causes the lighting control system 108 to hold a switch (for changing intensity or color) closed for the period defined by the timer. During the period of the timer, the system continues to monitor the sound level. If the sound level has not dropped to within the desired range or below the desired threshold, then the timer is reset and then thereby the switch continues to remain closed and cause the lights to remain in the altered condition, such as remaining dimmed.

For example, on a hospital floor there are patient rooms on either side of a long hallway. Additionally, there is a nursing station located anywhere adjacent to or in the hallway. The noise created by the hospital staff talking and using electronic devices can fill the hallway, penetrate into the patient rooms, and disturb the sleep and composure of the patients in the rooms. When the system 100 is installed near a nursing station its microphone 102 will continuously monitor the sounds being made in and around the nursing station.

In accordance with some aspects and embodiments of the invention, the microphone 102 includes the ability to distinguish between human generate sound (e.g. speech) and non-human generate sound (e.g. ringing of a phone). The microphone 102 can provide information related to the origin, source, and/or the type of the sound to the module 106 (shown in dashed line). The module 106 can utilize the information received from the microphone 102 to generate a signal that is specific to situations when the noise level event is caused by non-human sources. The module 106 can use the information received from the microphone for analysis that is provided to the client, especially when the noise level is due to non-human factors. In accordance with the various aspects and embodiments of the invention the microphone 102 passes or sends the sound information to the module 106, which performs the analysis of the sound for detection of non-human source.

In accordance with some aspects and embodiments of the invention, the microphone 106 includes the ability to distinguish between human generate sound (e.g. speech) and non-human generate sound (e.g. ringing of a phone). When the sound is speech related, the microphone 102 captures and sends sound information to the module 106 (shown in dashed line). The module 106 analyzes the sound to determine if there is any speech included in the sound. If so, then the module 106 analyzes the speech within the sound to determine a speech pattern. If the speech pattern indicates that the speaker is mentally stressed (agitated, frustrated, irritated, etc.), then the module generates a signal that is specific to the situation when the noise level event is caused by a human source with metal stress. The module 106 can use the information received from the microphone 102 for analysis and to generate a signal for the lighting control system 108, wherein the light wavelength is altered, as discussed herein. Additionally, the information is analyzed and provided to the client, especially when the noise level is due to human factors. In accordance with the various aspects and embodiments of the invention, the analysis of the sound for detection of speech patterns from a human source is performed at the microphone unit that includes speech recognition and analysis capability.

When the staff begins to speak in loud voices or turn on electronic devices that emit loud sounds, the microphone 102 will send the sound signal to the decibel meter 104. The decibel meter 104 will transmit the decibel levels of the sounds to the module 106. In accordance with one aspect and embodiment of the invention, the module 106 will analyze the signal, that includes information about decibel levels, based on a pre-programmed protocol. When a pre-programmed target decibel level is reached, the module 106 will generate a signal. The system 100 will relay the control signal, which is a light dimming signal, to the lighting control system 108. The lighting control system 108 causes the lights for the nursing station and in the hallways to be dimmed. In accordance with one aspect and embodiment of the invention, the control signal causes the lighting control system 108 to alter the wavelength/color of the lights. The dimming of the lights will be a signal for the hospital staff to lower their voices and/or turn down the volume on any loud electronic devices. The patients in their rooms will then be able to sleep or rest with composure. As the noise level drops, the system 100 can send another control signal to the lighting control system 108 to cause the lights to become brighter or return to the previous illumination level.

In accordance with various aspects and embodiments of the invention, the system 100 is in communication with a remote system 150, such as a remote server and/or database. The remote system 150 receives information or data from the system 100 related to sound control events in the controlled or monitored space. In accordance with various aspects and embodiments of the invention, the server 150 is shown with a speech detection module (broken line is an indication of optional or alternative embodiment) included as part of the remote server and database 150. As such, information collected by the microphone 102 is sent through the module 106 to the remote server 150, where the information collected can be stored and/or analyzed (either in real time or at a designated time).

The system 100 monitors the controlled space for the noise levels. The monitored information is gathered, especially around a triggering noise level event that results in generation of the control signal. The information that is near-in-time and associated with the event is captured by the system 100. The system 100 sends the information associated with the event to the remoter system 150. The remote system 150 analyzes the information associated with the noise events. The remote system 150 can then build a profile of the noise events for the controlled space. This profile can be provided to the owner or controller of the space. The profile can include any of the following: noise level changes and the rate of change of the noise level leading up to the event, the timing of the event, the duration of the event, the type of noise that triggered the event, etc. In accordance with various aspects and embodiments of the invention, the system 100 includes a data analysis module (not shown) that performs the same function as the remote system 150. In accordance with various aspects and embodiments of the invention, the system 100 is in communication with a data analysis system (not shown) that is located in the space being monitored by the system 100 and in communication with the system 100. The data analysis system performs the same or similar function as the remote system 150.

Figure 2:
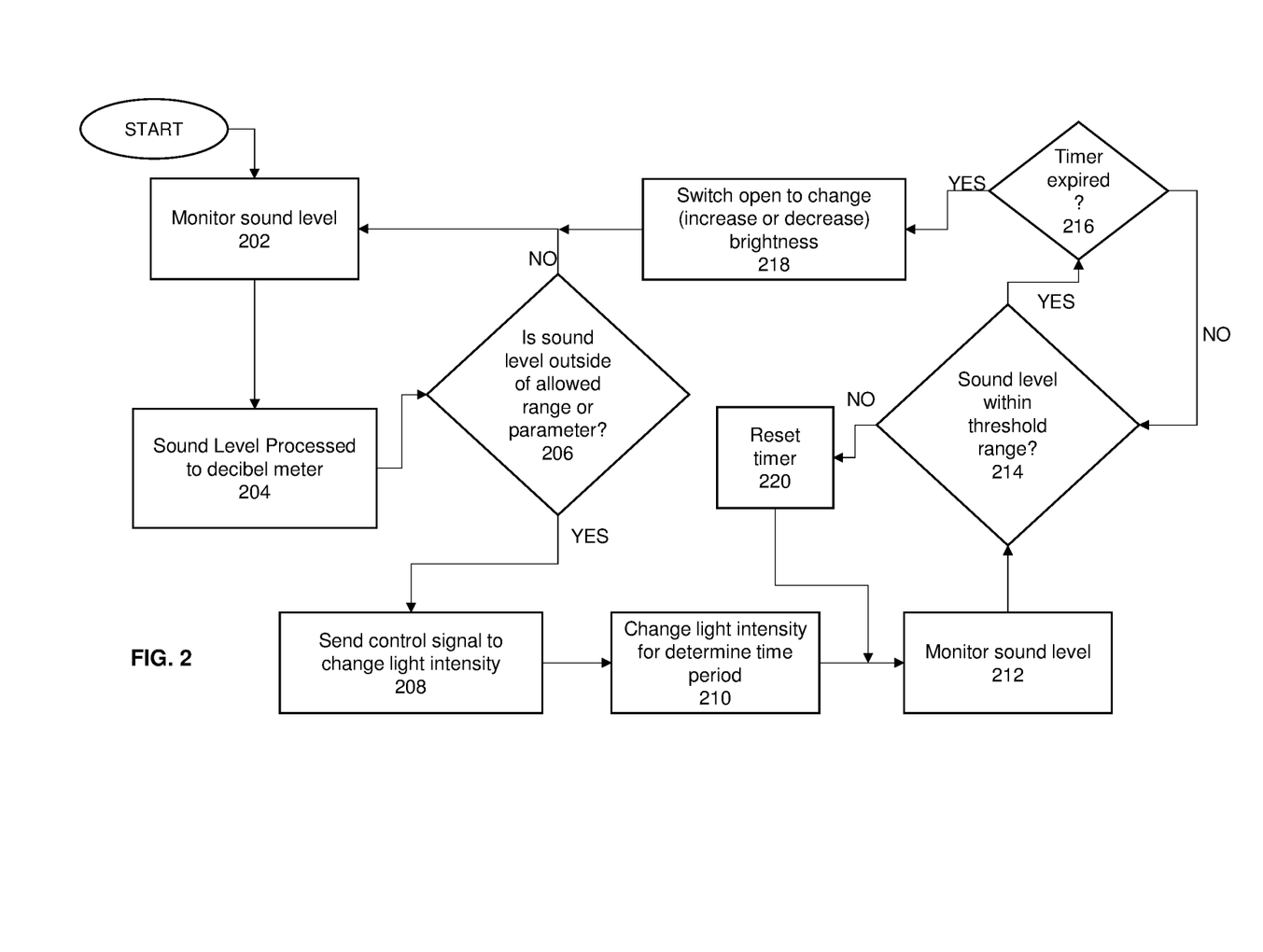
FIG. 2 shows a flow process for adjusting sound level in accordance with various aspects and embodiments of the invention.

Referring now to FIG. 1 and FIG. 2, a process is shown in accordance with the various aspects and embodiments of the invention. At step 202 the microphone 102, which is placed in a space, detects the sound level. The microphone 102 sends the detected sound level to a decibel meter 104. At step 204, the decibel level is captured by the decibel meter 104. The decibel meter 104 sends the information to the module 106, where a software program further processes the information. At step 206, the system 100 determines if the sound or decibel level is outside a predetermined decibel level range, which includes an upper and lower threshold level. In accordance with various aspects and embodiment of the invention, if the sound level falls below the lower threshold level for the decibel level range, then the decision is made to intensify the lights and the timing of the event is tracked or recorded. In accordance with various aspects and embodiment of the invention, if the sound level falls below the lower threshold level for the decibel level range, then no action is taken with respect to the changing the light intensity and the system 100 simply records the date and time of the event. In accordance with various aspects and embodiment of the invention, if the sound level exceeds the upper threshold level for the decibel level range, then the decision is made to dim the lights.

At step 208, the module 106 sends a control signal to the lighting control system 108. In accordance with some embodiments, the information associated with the signal is stored in a database. The information may include: timestamp of when the noise or sound level exceeded or fell below the threshold upper and lower range; the level of the noise as measured; the intensity of the lighting system at the time the noise level is detected or measured; the duration of time since the last control signal was sent to the lighting control system 108.

In accordance with various aspects of the invention, if the sound level does not exceed the upper threshold sound level (or falls below a lower threshold level), then the process continued to step 202 and the microphone 102 continues to monitor for and detect the noise or sound level in the space. If at step 206 the system 100 determines that the decibel level is too high (i.e. upper threshold noise or sound level has been exceeded), then at step 208, a signal is sent to the lighting control system 108 to dim the lights. In accordance with some aspects and embodiment of the invention, if at step 206 the system 100 determines that the decibel level is too low (i.e. the sound level is lower that the lower threshold noise or sound level), then at step 208 a signal is sent to the lighting control system 108 to intensify the lights to indicate the sound level can be increased. In accordance with one embodiment of the invention, the module 106 sends the signal to the lighting control system 108 in order to change the color of the lights. At step 210 the light intensity is changed in the monitored space. Once the lights in the monitored space are changed, the staff in the monitored space will notice that the noise level needs to be adjusted. In the case where the lights are dimmed, the staff will lower their voices and/or lower the volume on any loud electronic devices.

After the light intensity is changed, at step 212 the system continues to monitor the sound level. At step 214, the system determines if the sound level has returned to an acceptable level, which is within the threshold range. If not, then at step 220 the system 100 resets the timer (for holding the control switch closed) and the process returns to step 212. If so, then at step 216 the process determines if the timer has expired. If the timer has not expired, then the switch that was activated by the control signal remains closed and the light intensity of the lights remain the same. The process returns to step 214 to determine if the sound level is within the acceptable range or desired level.

If at step 216 it is determined that the timer has expired, then at step 218 the switch is opened resulting in the light intensity changing. In accordance with some aspects and embodiments of the invention, at step 218 the system 100 sends another control signal to the lighting control system 108 to cause the switch, which is closed, to open and, thereby, change the brightness of the lighting in the space or return it to the previous level of intensity. If the sound level has not decreased to a desired level, then the system 100 continues to monitor the noise or sound level in the space.

Figure 3:
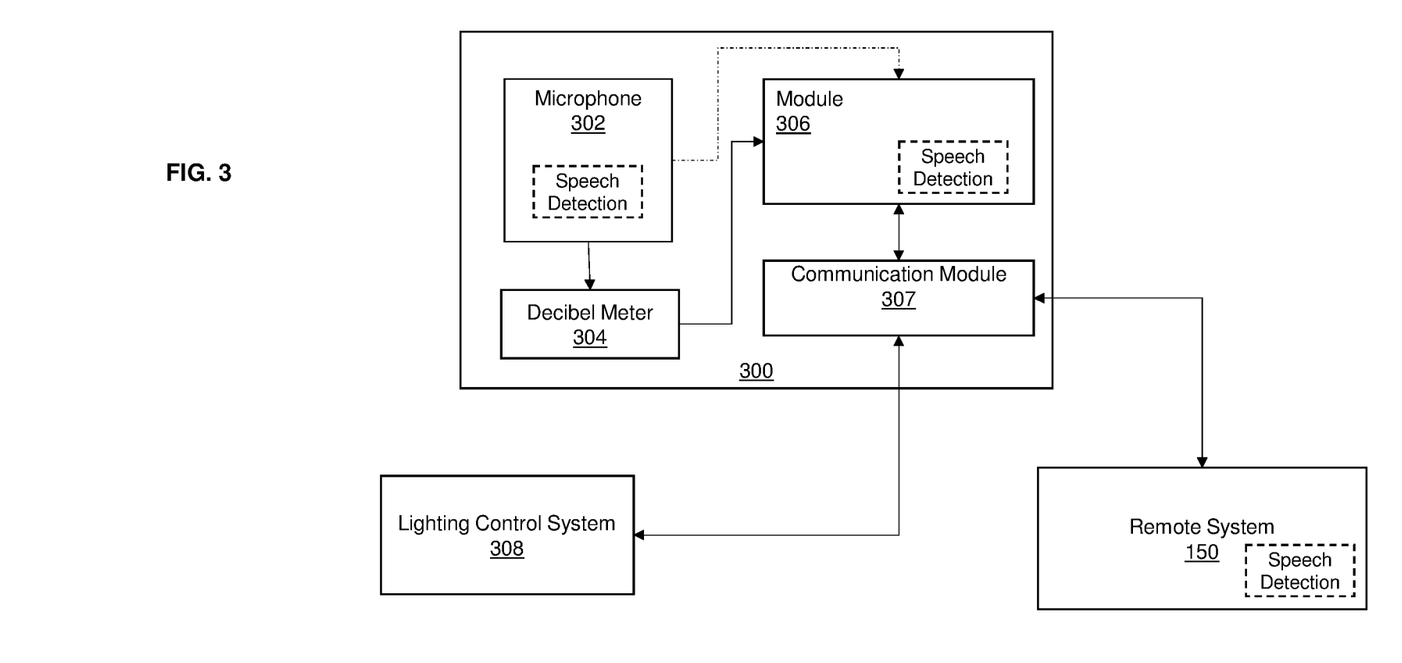
FIG. 3 shows a system for adjusting sound level in accordance with various aspects and embodiments of the invention.

Referring now to FIG. 3, according to various aspects and embodiments of the invention, a sound control system 300 includes a microphone 302 or other sound gathering device, a decibel meter 304, and a control module 306. In accordance with various aspects and embodiments of the invention, the system 300 is shown with a speech detection module (broken line indicates optional) included any one or more of: the microphone 302, the module 306. Additionally, the speech detection module may be included at a remote system 150, as shown. In accordance with various aspects and embodiments of the invention, the control module 306 includes the ability to receive and send communication to other devices, via wireless or wired connection. In accordance with various aspects and embodiments of the invention, the system 300 includes a communication module 307 with the ability to receive and send information to and communicates with other devices.

In accordance with various aspects and embodiments of the invention, the system 300 is in communication with a remote system 150, such as a remote server and/or database as described with respect to FIG. 1. The microphone 302 communicates sound signal information to the decibel meter 304. The decibel meter 304 analyzes the sound signal information. The decibel meter 304 generates a decibel level signal and communicates the decibel level signal to the module 306. The module 306 includes a protocol, which can be customized for each specific user.

Using the protocol, the module 306 generates a trigger or control signal for altering the lighting color or controlling lighting conditions. The system 300 is in communication with a lighting control system 308. The system 300 sends the signal to the lighting control system 308. As noted herein, in accordance with various embodiments of the invention, the signal is sent between the system 300 and the system 308 via a hard wire connection or using a wireless interface. Additionally, the various embodiments allow for communication with the lighting control system 308, at least, via a direct communication channel or through a web-based channel.

The microphone 302 continuously monitors a space, such as a client's facility. The microphone 302 captures and sends sound signal information to the decibel meter 304. The decibel meter 304 sends the decibel levels of the sound information received from the microphone 302 to the module 306. The module 306 is in communication with the lighting control system 308. In accordance with some embodiments, the system 300 is wired directly into the lighting control system 308. In accordance with some embodiments, the system 300 uses a wireless signal to communicate with the lighting control system 308.

As the noise level in the environment falls or rises to fall outside of a defined range, the protocol determined what action should be taken. In some aspects of the invention, the sound level needs to be lowered. In some aspects of the invention, the sound level is allowed to increase. The response of the system 300 is to generate a control signal that is sent, which is based on the pre-programmed contact closure protocol.

Taking the example where the sound exceeds the threshold or exceeds a threshold decibel level or a target decibel level, the decibel meter 304 generates a decibel level signal. The system 300 sends the decibel level signal to the module 306. In accordance with one aspect of the invention, the module 306 includes a pre-programmed protocol. The protocol can be customized. The protocol programming can be changed or updated in real-time as needed. The protocol includes threshold information, which can be customized for each user. The module 306 generates the control signal. The system 300 includes a communication module 307 that is in communication with the module 306. In accordance with some aspects and embodiments of the invention, the communication module is separate from the system 300 (not shown). The communication module 307 sends the control signal to the lighting control system 308. The lighting control system 308 modifies the color of the lights in the monitored space based on the control signal received. In accordance with some aspects and embodiments of the invention, the module 306 includes a timer unit (not shown). In accordance with some aspects and embodiments of the invention, the system 300 includes a timer unit that is in communication with the module 306 (not shown).

In accordance with one embodiment of the invention, the control signal triggers a timer and the control signal causes the lighting control system 308 to hold a switch (for color change) closed for the period defined by the timer. During the period of the timer, the system continues to monitor the sound level. If the sound level has not dropped to within the desired range or below the desired threshold, then the timer is reset and the thereby the switch (for color change) continues to remain closed and cause the light color to remain changed.

For example, in a school classroom there may be classes of students from pre-kindergarten up through high school. The noise created by boisterous students talking, joking, or using electronic devices can fill the classroom and disturb the concentration of other students and disturb the composure of the instructor. When the system 300 is installed in a classroom its microphone 302 will continuously monitor the sounds being made in the room. When students begin to speak in loud voices, joke, laugh, or turn on electronic devices that emit loud sounds, the microphone 302 will send the sound signal to the decibel meter 304. The decibel meter 304 will transmit the decibel levels of the sounds to the module 306. In accordance with one aspect and embodiment of the invention, the module 306 will analyze the signal, which includes information about decibel levels, based on a pre-programmed contact control protocol. When a pre-programmed target decibel level is reached, the module 306 will generate a signal. The system 300 will relay the signal, which is a control signal as a light color changing signal, to the lighting control system 308 and the color of the lights in the classroom will change to a preselected color of dawn or dusk. The change of color of the lights will be a signal for the students to be silent or lower their voices and/or turn down the volume on any loud electronic devices. The students in the classroom will then be able to concentrate and learn. The teacher will also be able to focus on delivering his/her lesson plan rather than policing boisterous students. As the noise level drops, the system 300 can send a signal to the lighting control system 308 to cause the lights to return to the previous normal illumination color.

Figure 4:
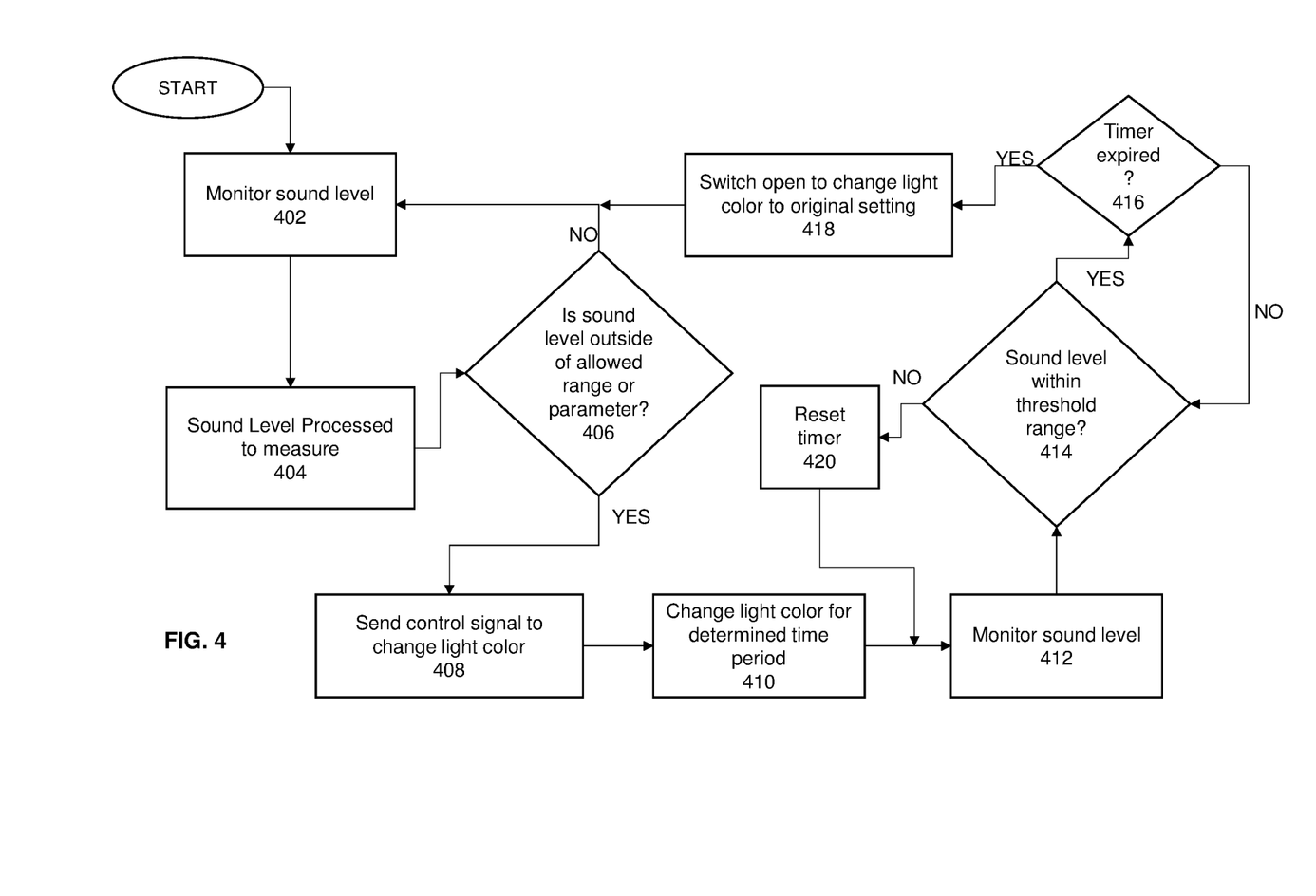
FIG. 4 shows a flow process for adjusting sound level in accordance with various aspects and embodiments of the invention.

Referring now to FIG. 3 and FIG. 4, according to various aspects and embodiments of the invention, a process is shown for altering lighting conditions. At step 402 the microphone 302, which is placed in a space, detects the sound level. The microphone 302 sends the detected sound level to a decibel meter 304. At step 404, the decibel level information is sent from the decibel meter 304 to the module 306 is processed and analyzed to determine sound level. The module 306 uses a protocol to process the decibel level information. At step 406 the system 300 determines if the sound or decibel level is outside a predetermined decibel level range, which includes an upper and lower threshold level. In accordance with various aspects and embodiment of the invention, if the sound level falls below the lower threshold level for the decibel level range, then the decision is made to restore the usual color the lights and the process returns to step 402 to continue monitoring the space. In accordance with various aspects and embodiment of the invention, if the sound level exceeds the upper threshold level for the decibel level range, then the decision is made to change the color of the lights.

At step 408, the module 306 (through the communication module 307) sends a control signal to the lighting control system 308. In accordance with some embodiments of the invention, the information associated with the control signal is stored in a database. The information may include: time-stamp of when the noise or sound level exceeded or fell below the threshold upper and lower range; the level of the noise as measured; the intensity of the lighting system at the time the noise level is detected or measured; and the duration of time since the last control signal was sent to the lighting control system 308.

In accordance with various aspects of the invention, if the sound level does not exceed the upper threshold sound level (or fall below a lower threshold level), then the process continued to step 402 and the microphone 302 continues to monitor for and detect the noise or sound level in the space. If at step 406 the system 300 determines that the decibel level is too high (i.e. upper threshold noise or sound level has been exceeded), then at step 408 a signal is sent to the lighting control system 308 to change the color of the lights. As noted, certain colors or wavelength of the light are clamming or soothing lights colors that impact the people in the space to become calmer or more settled.

In accordance with some aspects and embodiment of the invention, if at step 406 the system 300 determines that the decibel level is too low (i.e. the sound level is lower that the lowest threshold noise or sound level), then at step 408 a signal is sent to the lighting control system 308 to restore the lights to the standard color. In accordance with one embodiment of the invention, the module sends the signal to the lighting control system 308 in order to change the color of the lights. At step 410 the light color is changed in the monitored space. Once the light color in the monitored space is changed, the people in the monitored space will subconsciously relax and lower their voices.

After the light wavelength or color is changed, at step 412, the system continues to monitor the sound level. At step 414, the system determines if the sound level has returned to an acceptable level, which is within the threshold range. If not, then at step 420 the timer (for holding the control switch closed) is reset and the process returns to step 412. If so, then at step 416 the process determines if the timer has expired. If the time has not expired, then the switch that controls the color remains activated and the light color remains the same. The process returns to step 414 to determine is the sound level is within the acceptable range or desired level. If at step 416, it is determined that the timer has expired, then at step 418 the switch is opened resulting in the light color changing. In accordance with various aspects and embodiment of the system, the lighting control system 308 includes multiple different switches, each for control activation of one specific color of the light; each switch being activated or deactivated by a specific control signal from the system 300 that is dependent on how the module 306 is programmed. This same concept is applicable to the system 100 and the lighting control system 108 in that different switches can be used, each controlling a different intensity level, and activated with a specific signal.

In accordance with some aspects and embodiments of the invention, at step 418, the system 300 sends another control signal to the lighting control system 308 to cause the lighting control system 308 to change the wavelength of the light or the color of the lighting in the space. If the sound level has not decreased to a desired level, then the system 300 continues to monitor the noise or sound level in the space.

In accordance with other aspects and embodiments of the invention, other factors can be used to alter the intensity or color of the light, such as time and new people being introduced, coming into, or brought to the space being monitored. For example, the light intensity or color can be changed based on an elapse time or based on the time of day. Also, the light intensity or color can be changed based on personal changes in the space or at a specific shift change to ensure a quite transition or change in shift. In accordance with some aspects and embodiment of the invention, other means can be used to change the light intensity instead of a switch that is closed, such as a dimmer.

Figure 5:
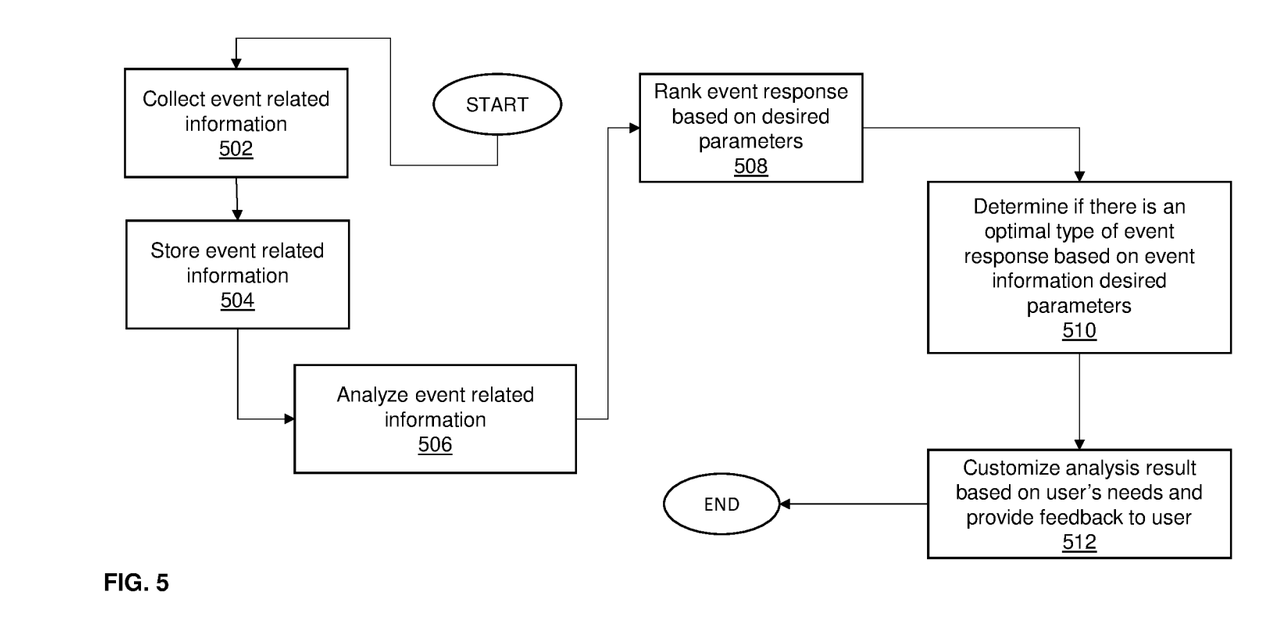
FIG. 5 shows a process for analysis of lighting control events in accordance with various aspects and embodiments of the invention.

Referring now to FIG. 5, a process is shown, in accordance with various aspects and embodiments of the invention, for analysis of the information, which is collected by the module and associated with an event that triggered generation of the control signal. The event is triggered when the sound volume falls outside of a defined range. In accordance with some aspects and embodiments of the invention, the microphone captures the sound or noise and sends information related to the sound to the decibel meter and information related to origin of the sound to the module. The sound or noise can originate from human sources, from non-human sources, or a combination of both. The information that is received at the module may be analyzed, may be recorded and logged in a database for future analysis, or may be sent to a remote location for analysis. At step 502 the system captures (collects) parameters for the event related information. The parameters are noise related information that may include: origin/source of the noise; volume of the noise; proximity of the noise; timestamp of first detection when the noise goes outside an acceptable range; duration of time the noise remains outside the acceptable range, speech pattern recognition within the noise to determine the person's level of agitation (mental stress level), and the type of control signal sent to the lighting control system to control the noise. At step 504, the event related information is stored in memory (if local) or in a database (may be a remote databased) for analysis.

At step 506, the event related information is analyzed. The analysis may be customized to the needs of the client. In accordance with some aspects of the invention, the analysis includes comparison of multiple different event related information relative to each other to determine or identify specific reaction times or patterns of response. For example, the analysis includes determination of the duration of time that passes between the instant the control signal is sent (to change the lighting) and the lapsed time until the noise level falls within the acceptable range. The duration of time (and associated control signal) can be compared to other events (and their associated duration of times). Accordingly, the system can provide an evaluation of the effectiveness of any control signal based on the duration of time event continues; the shorter the duration of time, the more effective the control signal.

At step 508 the quality of the control signals or the effectiveness of the control signal is ranked. In accordance with one aspect of the invention, the ranking is based on the duration of time taken for the noise level to fall within an acceptable range. In accordance with some aspects of the invention, the raking is based on other parameters measured, as outlined above.

At step 510 the system determines if there is an optimal control signal for a specific type of triggering noise level event. This allows the system to provide updates to the control module. In accordance with one aspect of the invention, the updates to the control module come from a remote location. In accordance with one aspect of the invention, the updates to the control module are internal to the system, such as system 100 or 300.

At step 512 the process provides customized data to the client. The client can receive any information stored at step 504, the analyzed information at step 506, as well as optimal types of response based on the best control signal as determined at step 510. The information or feedback provided to the owner of the space (client) is used or can be used for further and future planning of management of activity in the space. For example, if the space is a hospital or a classroom, the information can be analyzed to determine if there are patterns associated with the noise or sound level exceeding the threshold. Additionally, information can be provided about the timing of when the noise or sound level drops below a desired level as well as to how low the noise level drops. The information can be collected and analyzed at a remote location and the analysis provided to the hospital or educational institution.

The systems discussed herein work by executing code on computer processors. A computer or computing device or computer processor includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host. Various embodiments store software for such processors as compiled machine code or interpreted code on non-transitory computer readable media.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Therefore, the scope of the invention is not intended to be limited to the various aspects and embodiments discussed and described herein. Rather, the scope and spirit of invention is embodied by the appended claims.

What is claimed is:

1. A system deployed in an indoor space having lights, the system comprising:
   a microphone for detecting audio in the space;
   a decibel meter in communication with the microphone for receiving the detected audio to generate noise level information; and
   a control module in communication with the decibel meter,
   wherein the control module receives the noise level information from the decibel meter and determines if the noise level information is outside a defined volume range, wherein the control module generates a control signal when the noise information is outside the defined volume range.

2. The system of claim 1 further comprising a lighting control system, wherein the lighting control system receives the control signal and adjusts the intensity of the lights in the space.

3. The system of claim 1 further comprising a lighting control system, wherein the lighting control system receives the control signal and adjusts the wavelength of lights in the space.

4. A system comprising:
   a microphone for capturing audio information, wherein the audio information includes sound level and time-stamp;
   a decibel meter in communication with the microphone for converting the sound level into a decibel value; and
   a control module in communication with the decibel meter, wherein the control module receives the decibel value from the decibel meter and determines if a lighting in a space should be adjusted to indicate that the sound level in the space needs to be adjusted, wherein the control module generates a control signal based on a protocol when the sound level needs to be adjusted.

5. The system of claim 4, wherein the time-stamp is stored in memory.

6. The system of claim 4 wherein a lighting control module is in communication with the control module and the system sends the control signal to the lighting control module in order to adjust the lighting in the space.

7. The system of claim 4, wherein the control signal causes a light intensity to change.

8. The system of claim 4, wherein the control signal causes a light wavelength to change.

9. The system of claim 4, wherein the lighting is LED that can have intensity and wavelength adjusted.

10. A non-transitory computer readable medium for storing code that is executed by a system's processor to cause the system to:
- detect sound level within a monitored space;
- determine if the sound level is outside of an allowable decibel range;
- generate a control signal to alter lighting conditions within the monitored space when the sound level is outside of the decibel range; and
- use the control signal to alter the lighting conditions within the monitored space.

11. The non-transitory computer readable medium of claim 10, wherein the control signal alters a lighting intensity in the monitored space.

12. The non-transitory computer readable medium of claim 10, wherein the control signal alters wavelength to change color of the lighting in the monitored space.

13. The non-transitory computer readable medium of claim 12, wherein the control signal is derived from speech pattern analysis.

* * * * *